United States Patent [19]

Takahashi

[11] Patent Number: 5,210,567
[45] Date of Patent: May 11, 1993

[54] CAMERA CONTROL DEVICE

[75] Inventor: Minoru Takahashi, Saitama, Japan

[73] Assignee: Fuji Photo Film Co., Ltd., Kanagawa, Japan

[21] Appl. No.: 748,822

[22] Filed: Aug. 22, 1991

[30] Foreign Application Priority Data

Aug. 22, 1990 [JP] Japan .................. 2-220435

[51] Int. Cl.⁵ .................. G03B 15/05; G03B 17/24; G03B 17/04
[52] U.S. Cl. .................. 354/412; 354/418; 354/106; 354/187
[58] Field of Search .......... 354/412, 418, 484, 127.11, 354/127.12, 145.1, 105, 106, 400, 127.1, 187, 188

[56] References Cited

U.S. PATENT DOCUMENTS

| | | | |
|---|---|---|---|
| 4,970,538 | 11/1990 | Ichikawa et al. | 354/145.1 |
| 4,982,218 | 1/1991 | Tsuboi et al. | 354/400 |
| 5,023,470 | 6/1991 | Onozuka et al. | 354/127.1 |
| 5,045,876 | 9/1991 | Aihara | 354/145.1 |
| 5,089,833 | 2/1992 | Takahashi et al. | 354/105 |

Primary Examiner—Michael L. Gellner
Assistant Examiner—Jae N. Noh
Attorney, Agent, or Firm—Young & Thompson

[57] ABSTRACT

A main CPU of a camera, which sequentially controls the operation of the camera according to a sequence, drives a flash unit to emit light, while a charge control device controls charging of the flash unit, and is incorporated in a secondary CPU included in a date module for recording the date of photographing on the film simultaneously with taking an image. After the main CPU terminates the sequence of operation, the charge control device starts charging the flash unit to a predetermined level and thereafter repeats supplementary charging at regular intervals so as to maintain the charge at a predetermined level such as to emit a sufficient flash, for a predetermined time period. The secondary CPU includes the charge control device operates in response to a low-frequency clock signal which is generated from a clock pulse generator in the date module. While the charge control device is activated, the main CPU is electrically disconnected from a main power source. The secondary CPU further includes a lens barrel retraction control device which retracts a lens barrel of the camera to a rest position when a predetermined time has elapsed after termination of a photographing sequence.

11 Claims, 5 Drawing Sheets

CAMERA CONTROL DEVICE

FIELD OF THE INVENTION

The present invention relates to a control device for a camera, and more particularly a control device for a camera having a flash unit and a date module for recording on the film the date of photographing.

THE KNOWN PRIOR ART

FIG. 4 shows the basic arrangement of a conventional camera wherein a central processing unit (CPU) 1 is connected to an automatic exposure (AE) unit 2, an autofocus (AF) unit 3, a film advancing unit 4, a flash unit 5 and a date module 6, so as to control these units. A switch SB is disposed on the rear lid of the camera, and is turned on when the rear lid is closed. When the switch SB is turned on, the CPU 1 is activated to drive the motor of the film advancing unit 4, thereby to advance preliminary frames, for example, the first three frames of a loaded film. As a result, the first available frame is set in the exposure position, and the camera is ready for photographing. Thereafter when a shutter release button is depressed halfway, a switch S1 is turned on, so that the CPU 1 causes the AE unit 2 and the AF unit 3 to measure the subject brightness and the subject distance, respectively. When the shutter release button is depressed fully, a switch S2 is turned on, thereby to cause the AE unit 2 to perform exposure. After exposure, the film advancing unit 4 advances the film by one frame.

During exposure, the CPU 1 outputs a date recording signal to the date module 6, thereby to record the date, and if necessary other information, optically on a predetermined area of the film. When the preliminary film advance is completed, and when the one-frame advance is completed after each exposure, the flash unit 5 charges a main capacitor thereof for the next exposure.

FIG. 5 shows an example of prior art communication between the flash unit 5 and the CPU 1. When, for instance, the one-frame advance is completed, the CPU 1 outputs a charge start signal F1 to the flash unit 5, which then starts charging the main capacitor. When the charge of the main capacitor reaches a predetermined level, the flash unit 5 outputs a charged-up signal F3 to the CPU 1. Upon receipt of the charged-up signal F3, the CPU 1 outputs a charge stop signal F2 to the flash unit 5, thereby to stop charging the main capacitor. It is to be noted that the above-mentioned charge stop signal F2 is outputted also while the shutter release button is depressed and the film is being advanced, even though the charged-up signal F3 is not yet outputted, so as to interrupt charging and to maintain the power supply voltage above a certain value, in order to prevent the CPU 1 from being affected by the fluctuation of the power supply voltage due to the motor drive. In this way, the CPU 1 can perform the AE and AF controls, the film advance or other controls in a stable manner.

When the flash unit 5 completes charging, the CPU 1 gives the flash unit 5 a flash command signal F4, whereupon a flash tube such as a xenon lamp emits light.

The above-described conventional flash unit 5 has a problem in that the main capacitor is discharged gradually in the course of time, and thus the intensity of the flash light (guide number) is lowered with time. Since conventional compact cameras have generally employed an automatic flash control system which is designed on the premise that the guide number of a flash tube is constant, it is necessary to maintain the charge of the main capacitor at a certain value.

For this reason, the main capacitor of the flash unit 5 is continuously charged up to a predetermined guide number, that is, until it becomes possible to emit a flash of a predetermined intensity. Once the capacitor is charged up, the charging is stopped for a predetermined time so as to prevent wasting the power supply provided by the battery. Thereafter, the capacitor is repeatedly charged e.g. once every one minute, so as to maintain the guide number above a predetermined level for a certain time period, e.g. three to five minutes. This time period, the so-called flash stand-by condition, is terminated five minutes after the start of charging. In this way, drain on the battery for charging is reduced while maintaining the proper level of the guide number.

Although the above-described conventional charge control system using a timer makes it possible to maintain the flash stand-by condition for a relatively long time period of three to five minutes while economizing the power necessary for charging, the CPU 1 would consume a relatively large amount of power for generating a clock signal so as to clock such a long time period, if a high-frequency clock generator, e.g. a 4 MHz clock generator, which is usually disposed in the CPU 1, is used to clock such a long time period.

For this reason, it is conventional to provide the CPU 1 with a low-frequency clock generator, e.g. a 32.768 kHz clock generator besides the high-frequency clock generator, and to use the low-frequency clock generator for the flash stand-by period, while using the high-frequency clock generator for the initial charging, because the low-frequency clock generator consumes an extremely small amount of power. However, because it is necessary to mount the two clock generators in the CPU 1, this solution makes the control circuit, that is, the CPU 1, expensive.

On the other hand, it is well-known in variable focal length cameras such as dual focal length cameras and zoom cameras, that a lens barrel is automatically retracted after photographing into a rest position or a shortest focal length position in which the lens barrel least protrudes from the camera body, for security, because the lens barrel must often protrude to a certain extent from the camera body during photographing. For this purpose, the control circuit controls the lens barrel to retract the same to a predetermined withdrawn position when five minutes have elapsed after completion of the last operation of the camera such as shutter releasing, film loading, or film rewinding. Accordingly, the CPU 1 also consumes a relatively large amount of power by clocking these five minutes as to start retracting the lens barrel. This is disadvantageous to economizing the power of the battery.

OBJECT OF THE INVENTION

In view of the foregoing, the present invention has as an object the provision of a control circuit for a camera which is inexpensive and consumes little power for controlling the charging of the flash unit and for controlling the retraction of the lens barrel.

SUMMARY OF THE INVENTION

To achieve the above and other objects, according to the present invention, a charge control device for maintaining the charge of the flash unit at a predetermined level is incorporated into a control unit for the date module.

The present invention further provides the incorporation of a lens barrel retraction control device into the date module control unit.

According to the present invention, because the date module control unit includes a low-frequency clock generator for clocking the date and time, and the low-frequency clock generator is made use of for maintaining the charge of the flash unit at a predetermined level, that is, periodical charging of the flash unit, it becomes unnecessary to provide an expensive control circuit having two clock generators of different frequency and it also becomes possible to control charging at extremely low power. In the same way, it is also possible to control the retraction of the lens barrel at low power and at low cost.

According to a preferred embodiment of the invention, the main control unit of the camera can be electrically disconnected from the main power source after terminating a series of photographing steps, because the date module control unit controls the charging of the flash unit in the mean time. Since the date module must operate continuously in any case, this embodiment is attractive for economizing the main power source.

BRIEF DESCRIPTION OF THE DRAWINGS

The above and other objects and advantages of the present invention will become apparent from the following description of preferred embodiments when read in conjunction with the accompanying drawings, wherein like reference characters designate like or corresponding parts throughout the several views, and in which.

DETAILED DESCRIPTION OF THE PREFERRED EMBODIMENTS

Figure 1:
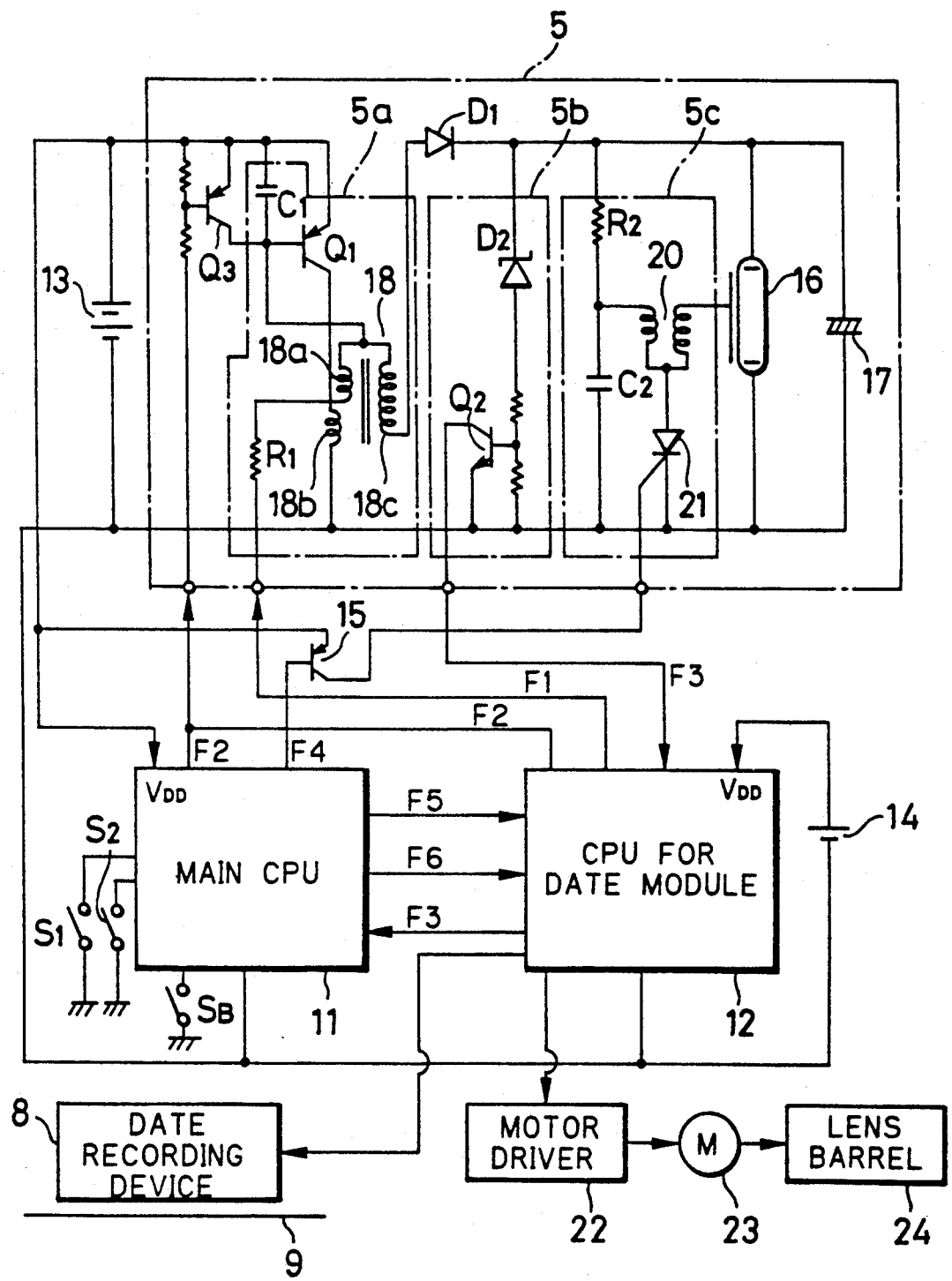
FIG. 1 is a diagram showing circuitry of a flash unit and control circuits therefor embodying the present invention.

FIG. 1 shows only such parts of a camera embodying the present invention as are necessary to explain the invention, wherein a flash unit 5 having a like construction as conventional flash units is connected not only to a main CPU 11 but also to a second CPU 12 which conventionally serves merely as a control unit of a date module. It is to be noted that the date module includes a date recording device 8 which is controlled by the second CPU 12 to record optically the date of photographing on an appropriate area of a photographic film 9 loaded in the camera.

The main CPU 11 is connected to the flash unit 5 through a buffer transistor 15 so as to drive the flash unit 5 to emit light, and the main CPU 11 and the flash unit 5 are connected to a battery 13 as the main power supply of the camera. On the other hand, the second CPU 12 is connected to a battery 14 as the power supply for the date module. The battery 14 is, for instance, a widely used coin-shaped lithium battery which lasts for four to five years when used in a low consuming device, such as the date module. Designated by $V_{DD}$ are the power input terminals of both CPUs 11 and 12.

A switch S1 for starting AE and AF operation of the camera, a switch S2 for starting exposure, and a switch SB disposed on the rear lid of the camera for preliminary film advancing are also connected to the main CPU 11, as is conventional. Namely, the main CPU 11 controls an AE unit, an AF unit and a film advancing unit besides the flash unit 5. The conventional AE and AF and the film advancing units are not shown, for simplicity of illustration.

The main CPU 11 outputs control signals also to the second CPU 12, that is, a date signal F5 instructing the second CPU 12 to record the date and/or time of photographing on the film, and a sequence end signal F6 indicative of the end of the program sequence executed by the main CPU 11, that is, the end of shutter release, film advancing or the like. The second CPU 12 further receives a charged-up signal F3 from the flash unit 5 and sends the charged-up signal F3 to the main CPU 11 when the charging of the flash unit 5 is completed. At that time, the above charged-up signal F3 appears in "low" level state, and because current flows out of an input terminal of the main CPU 11 when a "low" signal is applied to the input terminal, so the input terminal for the charged-up signal F3 is constructed as a pull-up resistor input which accepts the charged-up signal F3 only when the main CPU 11 is activated.

Although the main CPU 11 is always connected to the main power source provided by battery 13, the main CPU 11 is not activated after a sequence of processes are terminated, and the power of battery 13 is only negligibly consumed while the main CPU 11 is inactivated, because, at that time, only a leakage current of less than 1 $\mu$A flows through the battery 13.

The flash unit 5 comprises a blocking oscillator 5a, a charge voltage detection circuit 5b, a flash trigger circuit 5c, a rectifying diode D1, a transistor Q3 for charge-stopping, a xenon lamp 16 as a flash emitting element, and a main capacitor 17 for discharging through the xenon lamp 16. The blocking oscillator 5a includes an oscillating transistor Q1, an oscillating transformer 18 and a capacitor C1 for protecting the transistor Q1. The blocking oscillator 5a further includes a limiting resistor R1 for limiting current flowing into the second CPU 12 when the CPU 12 outputs a charge start signal F1 in "low" level state. The charge start signal F1 outputted from the second CPU 12 is applied to the base of the oscillating transistor Q1 through the limiting resistor R1 and a coil 18a of the oscillating transformer 18, so that the base voltage of the oscillating transistor Q1 becomes "low", thereby switching the transistor Q1 on. The collector current of the transistor Q1 flows through a primary coil 18b of the oscillating transformer 18, so that the magnetic field of the transformer 18 changes to generate a high voltage from the secondary coil 18c thereof. The high voltage from the oscillating transformer 18 is rectified through the rectifying diode D1, and charges the main capacitor 17 to a certain level.

On the other hand, when the second CPU 12 or the main CPU 11 outputs a charge stop signal F2 in "low" level state, the transistor Q3 is switched on, and thus the potential difference between the base and emitter of the oscillating transistor Q1 is cancelled, so that the oscillating transistor Q1 is switched off, thereby stopping the charging.

The charge voltage detecting circuit 5b consists of a Zener diode D2 and a transistor Q2. When the terminal voltage of the main capacitor 17 being charged reaches a predetermined level above which a proper exposure is available, e.g. 300 V, the Zener diode D2 becomes conductive and thus the transistor Q2 is switched on, so that the charged-up signal F3 is outputted to the second CPU 12.

The flash trigger circuit 5c consists of a trigger transformer 20, a flash triggering SCR (silicon control rectifier) 21, a capacitor C2 and a resistor R2. The capacitor C2 is charged to a voltage predetermined by the resistor R1. When the main CPU 11 outputs a flash command signal F4 in "low" level state, the buffer transistor 15 is switched on, and the flash command signal F4 is applied to the SCR 21, whereby the trigger transformer 20 generates a high voltage trigger signal which is applied to a trigger electrode of the xenon lamp 16. Upon receipt of the trigger signal, the xenon lamp 16 emits light using electric energy of the main capacitor 17.

The second CPU 12 is connected also to a motor driver 22 for driving a lens motor 23 so as to retract a lens barrel 24 to a predetermined position when a predetermined time, e.g. five minutes, has elapsed after a sequential operation controlled by the main CPU 11 was completed.

The operation of the above embodiment will be described with reference to FIGS. 2 and 3.

Figure 2:
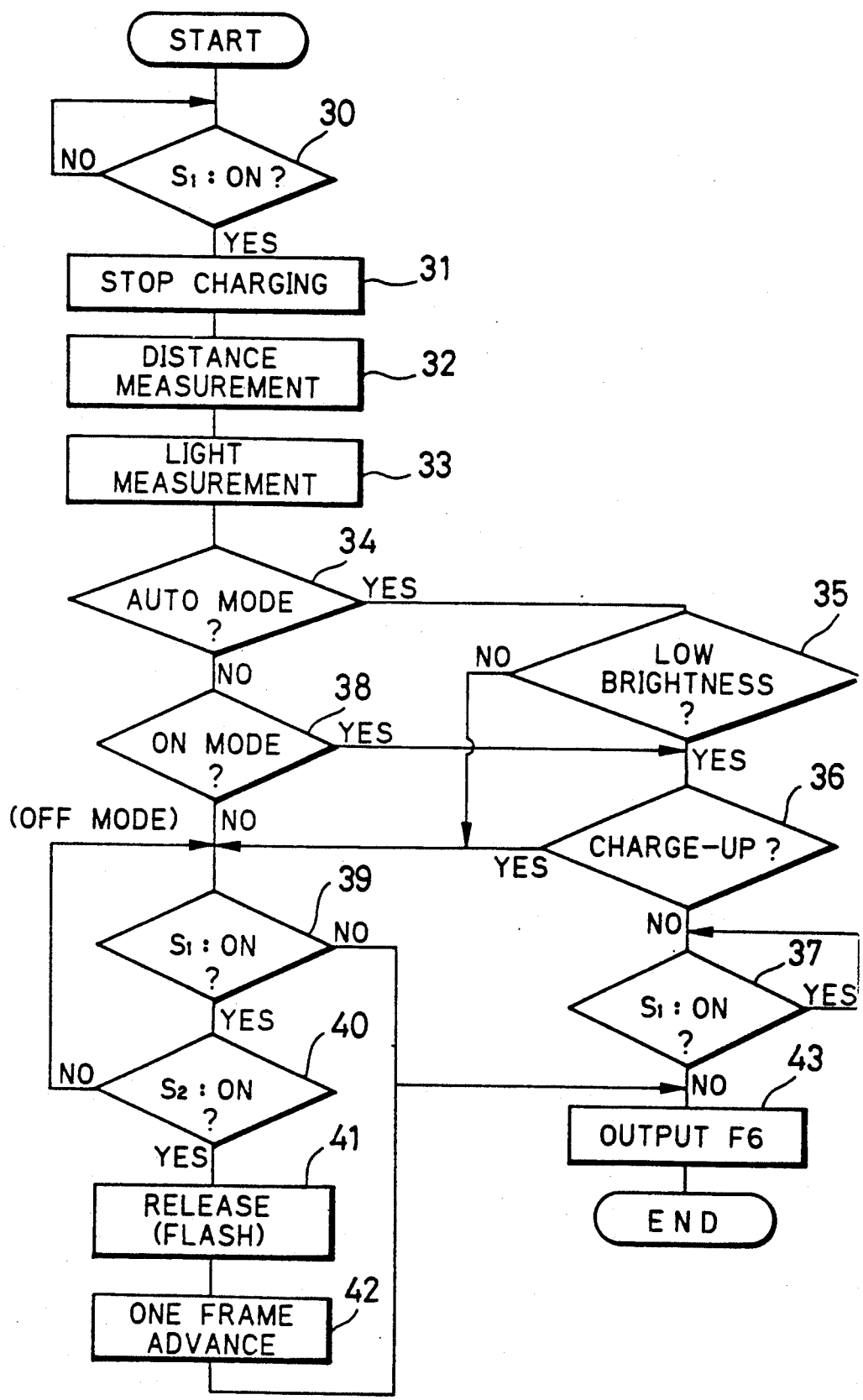
FIG. 2 is a flow chart explaining the operation of the main CPU shown in FIG. 1.

The flow chart of FIG. 2 shows the control sequence of the main CPU 11. When the switch S1 is switched on (step 30), the main CPU 11 outputs the "low" level charge stop signal F2 (step 31), so as to stop charging of the main capacitor 17 in the flash unit 5, thereby to stabilize the power supply voltage for the reason described above.

Next, the subject distance and the subject brightness are measured in steps 32 and 33. Thereafter, it is determined in step 34 whether the camera is set in an AUTO mode wherein the flash unit 5 is automatically activated when the subject brightness is below a predetermined level (dark level). If the answer is "yes" in step 34, then it is determined in step 35 whether the subject brightness is in the dark range. If the answer is "yes" in step 35, then it is determined in step 36 whether the charged-up signal F3 is outputted.

If the subject brightness is not in the dark range, or if the charged-up signal F3 is outputted, then the sequence proceeds to step 39 wherein it is determined whether the switch S1 is still switched on. If the answer is "yes" in step 39, then it is determined whether the switch S2 is switched on, that is, whether the shutter release button is fully depressed. If the switch S2 is switched on, a shutter release is performed to make an exposure (step 41). At that time, the xenon lamp 16 emits light upon the flash command signal F4, which is outputted from the main CPU 11 simultaneously with the shutter release if, in case of the AUTO mode, the subject brightness is in the dark range.

If it is determined in step 36 that the charged-up signal F3 is not outputted, then it is again determined whether the switch S1 is switched on. If the answer is "no", the main CPU 11 outputs the sequence end signal F6 to the second CPU 12 (step 43).

If it is determined in step 34 that the camera is not set in the AUTO mode, then it is determined in step 38 whether the camera is set in an ON mode (daylight synchro mode) wherein the flash unit 5 is activated for each exposure. If the answer is "yes" in step 38, the sequence proceeds to the above-described step 36. If the answer is "no" in step 34, that is, if the camera is set in an OFF mode inhibiting the flash, the sequence proceeds to the above-described step 39. Thereafter, the same procedures as above are executed.

Upon exposure, the main CPU 11 outputs the date recording signal F5 to the second CPU 12, so that the date and time of the exposure are optically recorded on the film simultaneously with the recording of the image.

After the exposure in step 41, a one-frame film advance is performed, and thereafter the sequence end signal F6 is outputted to the second CPU 12 (in steps 42 and 43).

In this way, the main CPU 11 outputs the sequence end signal F6 to the second CPU 12 when a sequence of steps is terminated, and is then automatically inactivated.

Figure 3:
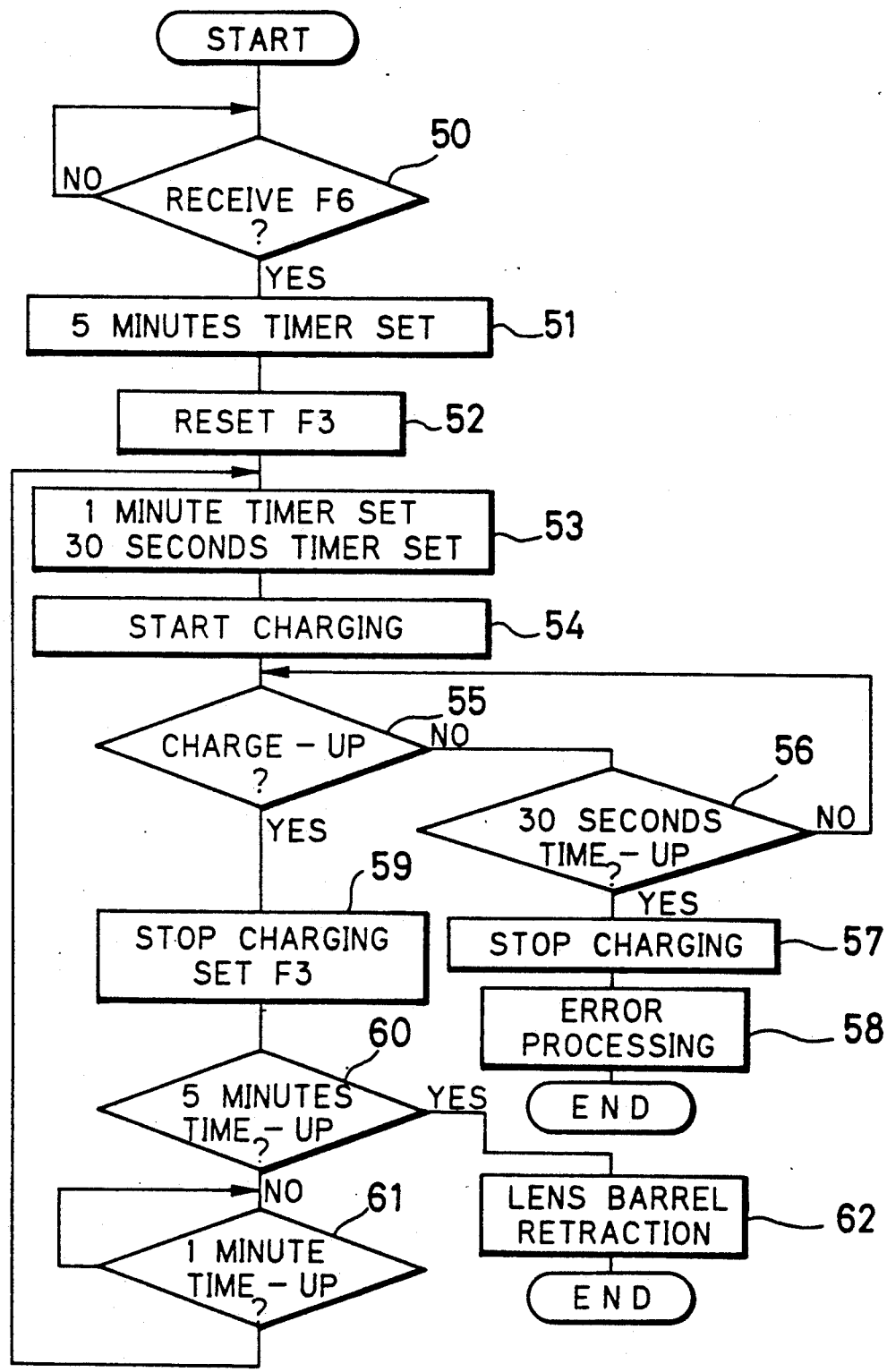
FIG. 3 is a flow chart explaining the operation of the CPU in the date module of FIG. 1.
Figure 4:
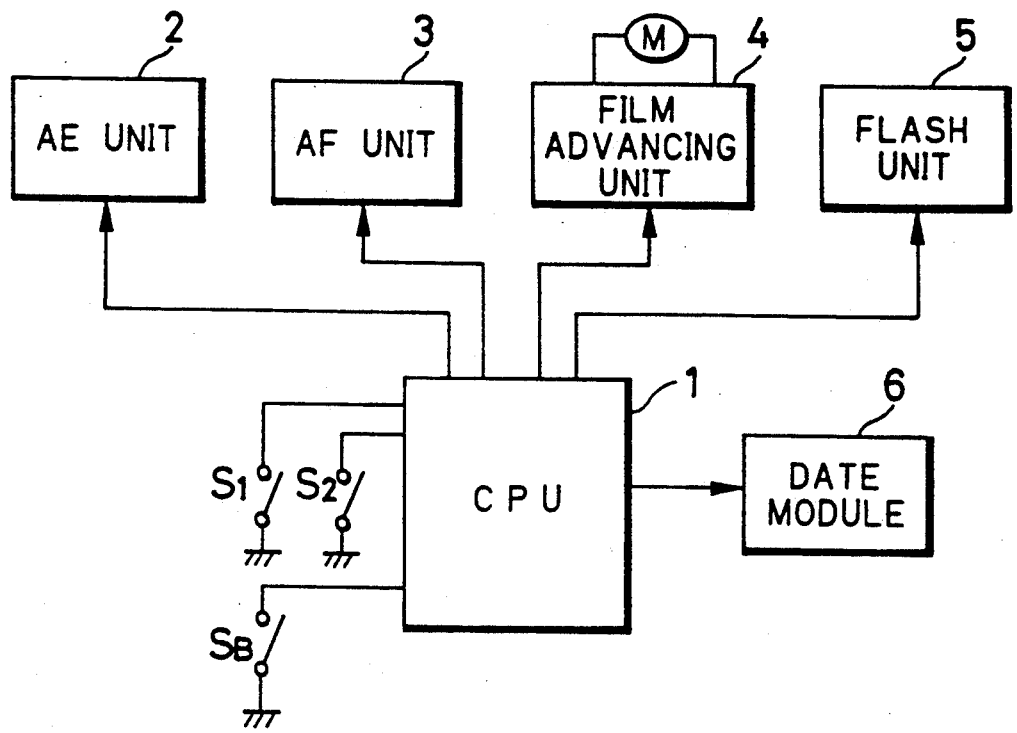
FIG. 4 is a block diagram showing circuitry of a prior art camera.
Figure 5:
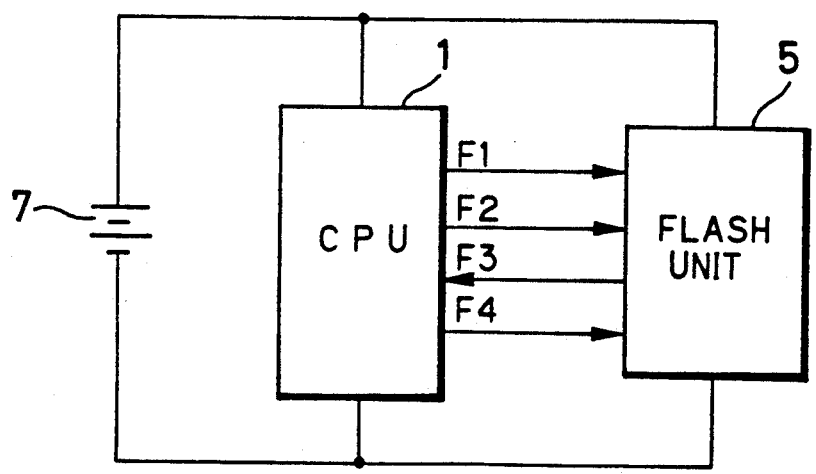
FIG. 5 is a block diagram showing mutual communication between the CPU and the flash unit of the prior art camera.
Figure 6:
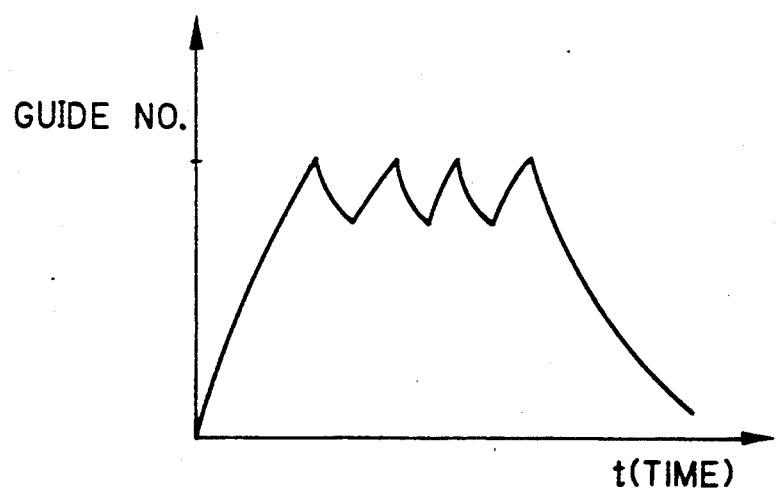
FIG. 6 is a time chart explaining the charge control in the prior art camera of FIGS. 4 and 5.

Referring now to FIG. 3 showing the control sequence of the second CPU 12, which starts the sequence upon receipt of the sequence end signal F6 from the main CPU 11 (step 50):

Firstly, a five-minute timer is set to start running, and then, the charged-up signal F3, having been inputted in the second CPU 12, is reset (steps 51 and 52). Next, a one-minute timer and a 30-second timer are set to start running, and then the charge start signal F1 is outputted to the flash unit 5 (steps 53 and 54). That is, the "low" level signal F1 is applied to the transistor Q1 of the blocking oscillator 5a, so that the transistor Q1 is switched on to start charging of the main capacitor 17. The charging itself is normally completed in no more than five to six seconds.

Thereafter, it is determined whether the charging is completed within 30 seconds after the start of charging. Whether the charging is completed or not is judged depending on whether the charged-up signal F3 is outputted from the charge voltage detecting circuit 5b, and if the answer is "no" in step 55, then it is determined in step 56 whether the time of the 30-second timer has fully run, that is, whether 30 seconds have passed since the start of charging. So long as the answer is "no" in step 56, step 55 is repeated until the charged-up signal F3 is detected. If the answer is "yes" in step 56, this is judged to be an error, so the charging is immediately interrupted in any case (step 57). At that time, error processing, such as the giving of an error indication, is executed in step 58.

If the charged-up signal F3 is detected before the time of the 30-second timer has fully run, the sequence proceeds to step 59 wherein the second CPU 12 applies the charge stop signal F2 to the transistor Q3 of the flash unit 5 and, at the same time, outputs the charged-up signal F3 continuously to the main CPU 11.

In next step 60, it is determined whether the time of the five-minute timer has fully run. If the answer is "no" in this step 60, then it is determined in step 61 whether the time of the one-minute timer has fully run. When the time of the one-minute timer has fully run, the sequence goes back to step 53, and the following steps are again executed after the one-minute timer and the 30-second timer are reset to start timing from the beginning. In this way, the main capacitor 17 is repeatedly charged up to a predetermined level at one-minute intervals, so that the main capacitor 17 always accumulates a charge sufficient to cause lamp 16 to emit a proper quantity of light.

If the answer is "yes" in step 60, it is judged that an operation of the camera is terminated, and thus it is unnecessary to stand-by for the next flash, so the second CPU 12 outputs a retraction signal to the motor driver 22. Then, the lens barrel motor 23 is driven to move the lens barrel 24 back into a retracted position or a shortest focal length position in which the lens barrel protrudes the least from the camera body. In this way, the taking lens is efficiently protected from being damaged.

Although the present invention has been described with reference to preferred embodiments, it will be understood that the present invention should not be limited to the above-described embodiments, but rather that various modifications are possible within the scope and spirit of the appended claims.

What is claimed is:

1. A control device for a camera of the type having a main control unit for controlling electric elements of the camera, a flash unit, and a date module for recording at least the date of photographing on a film, said control device comprising:
    a secondary control unit disposed in said date module; and
    charge control means for controlling charging of said flash unit so as to maintain the charge of the flash unit at a predetermined level such as to emit a sufficient flash, said charge control means being incorporated in said secondary control unit.

2. A control device as defined in claim 1, wherein said secondary control unit operates in response to a low-frequency clock signal generated from a clock pulse generator included in said date module.

3. A control device as defined in claim 2, wherein said secondary control unit includes a first power source, whereas said main control unit includes a second power source of supplying power to other electric elements of the camera, said second power source having an output higher than said first power source.

4. A control device as defined in claim 3, wherein said charge control means starts charging when said main control unit terminates a control sequence, and said main control unit is electrically disconnected from said second power source while said charge control means is activated.

5. A control device as defined in claim 1, wherein said charge control means charges said flash unit to said predetermined level and, thereafter, repeats supplementary charging at constant intervals for a predetermined time period.

6. A control device as defined in claim 1, wherein said flash unit outputs a charged-up signal to said secondary control unit when the charge thereof reaches said predetermined level, and said main control unit confirms that said secondary control unit receives said charged-up signal before driving said flash unit to emit light.

7. A control device as defined in claim 1, for a camera further comprising a movable lens barrel, a motor for moving said lens barrel back and forth, and a motor driver for driving said motor, wherein said secondary control unit further controls said motor driver to retract said lens barrel to a position in which said lens barrel protrudes the least from the camera, when a predetermined time has elapsed after the termination of a control sequence in said main control unit.

8. A control device as defined in claim 7, wherein said secondary control unit starts controlling of said motor driver when a predetermined time period of supplementary charging of said flash unit has elapsed.

9. A control device as defined in claim 8, wherein said predetermined time period is about five minutes.

10. A control device for a camera of the type having a movable lens barrel, a motor for moving said lens barrel back and forth, a motor driver for driving said motor, a main control unit for controlling electric elements of the camera, and a date module for recording at least the date of photographing on a film, said control device comprising:
    a secondary control unit disposed in said date module, said secondary control unit operating in response to a low-frequency clock signal generated from a clock pulse generator included in said date module; and
    a lens barrel control means for controlling said motor driver to retract said lens barrel to a position in which said lens barrel protrudes the least from the camera, when a predetermined time has elapsed after the termination of a control sequence in said main control unit, said lens barrel control means being incorporated in said secondary control unit.

11. A control device as defined in claim 10, wherein said secondary control unit includes a first power source, whereas said main control unit includes a second power source for supplying power to other electric elements of the camera, said second power source having an output higher than said first power source.

* * * * *